United States Patent [19]
Bedol

[11] Patent Number: 5,058,736
[45] Date of Patent: Oct. 22, 1991

[54] NOTEBOOK ORGANIZER INCLUDING SLIDABLE ELEMENT

[76] Inventor: Mark A. Bedol, 6980 Fabriano Pl., Rancho Cucamonga, Calif. 91701

[21] Appl. No.: 553,247

[22] Filed: Jul. 13, 1990

[51] Int. Cl.⁵ .......................... A45C 11/34; G06F 1/00
[52] U.S. Cl. ...................................... 206/214; 206/305; 206/576; 220/524; 220/526; 281/31; 364/705.01; 364/708; 402/4
[58] Field of Search ............... 206/232, 305, 320, 472, 206/576, 214, 224; 402/4, 79, 80 R; 281/29-31; D19/26, 27; 364/705.01, 705.06, 708; 220/524, 526, 528

[56] References Cited

U.S. PATENT DOCUMENTS

| | | | |
|---|---|---|---|
| 401,974 | 4/1889 | Smith | 220/524 |
| 2,048,980 | 7/1936 | Vanhooser | 281/31 |
| 2,194,003 | 3/1940 | Brooks | 206/214 X |
| 2,223,560 | 12/1940 | Friedlaender | 402/4 |
| 2,318,192 | 5/1943 | Boelema, Jr. | 281/31 |
| 2,495,687 | 1/1950 | Belmont . | |
| 2,677,376 | 5/1954 | Brunner . | |
| 3,126,891 | 3/1964 | Caputi | 206/214 X |
| 4,002,237 | 1/1977 | Nichols | 206/371 |
| 4,511,036 | 4/1985 | Castelli | 206/371 |
| 4,555,018 | 11/1985 | Cho | 206/214 |
| 4,614,450 | 9/1986 | Neiman | 402/79 |
| 4,824,273 | 4/1989 | Silva | 402/79 |
| 4,918,632 | 4/1990 | York | 364/708 |

*Primary Examiner*—Bryon P. Gehman

[57] ABSTRACT

A notebook organizer is disclosed which is sufficiently thin for convenient use in a ringed notebook. In its broadest aspects, the organizer comprises a base having a substantially flat bottom surface. The base has a border with a plurality of holes therethrough, the holes being adapted for engagement with the rings of a ringed notebook. The base includes a plurality of partitions dividing the base into a plurality of compartments. There is a lid associated with at least one of the compartments, including a lock for releasably securing the lid in a closed position. The lid has a substantially flat upper surface.

16 Claims, 1 Drawing Sheet

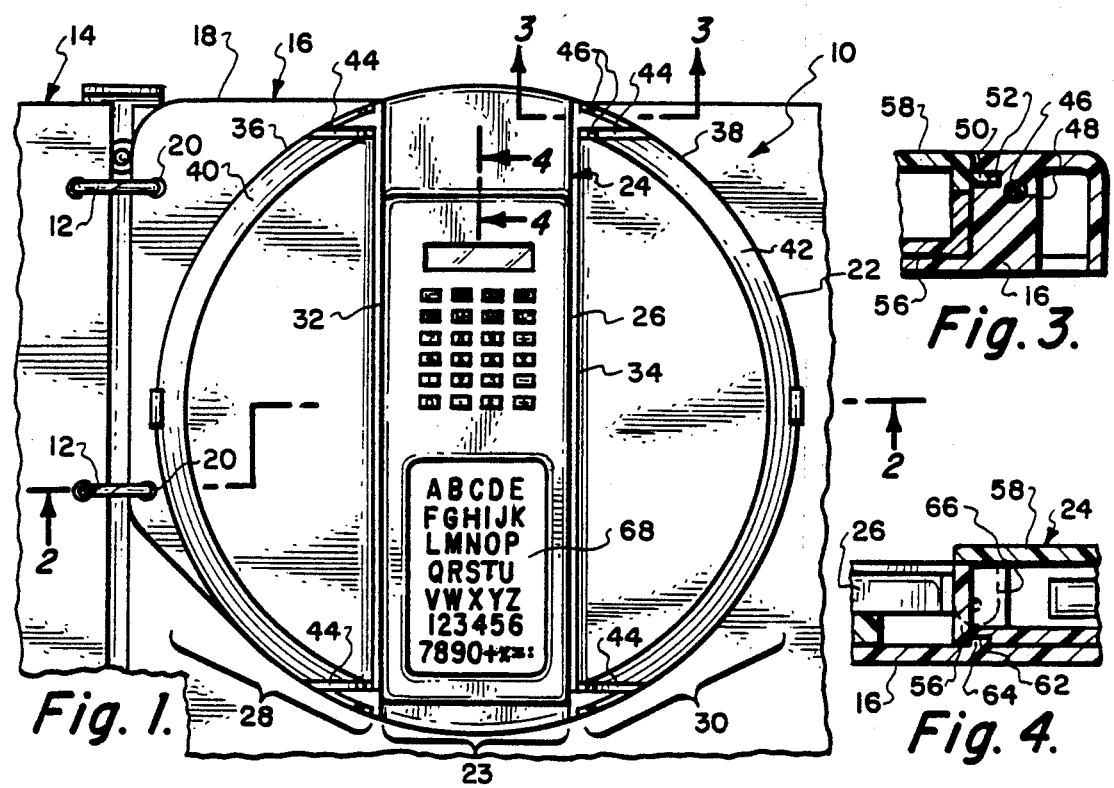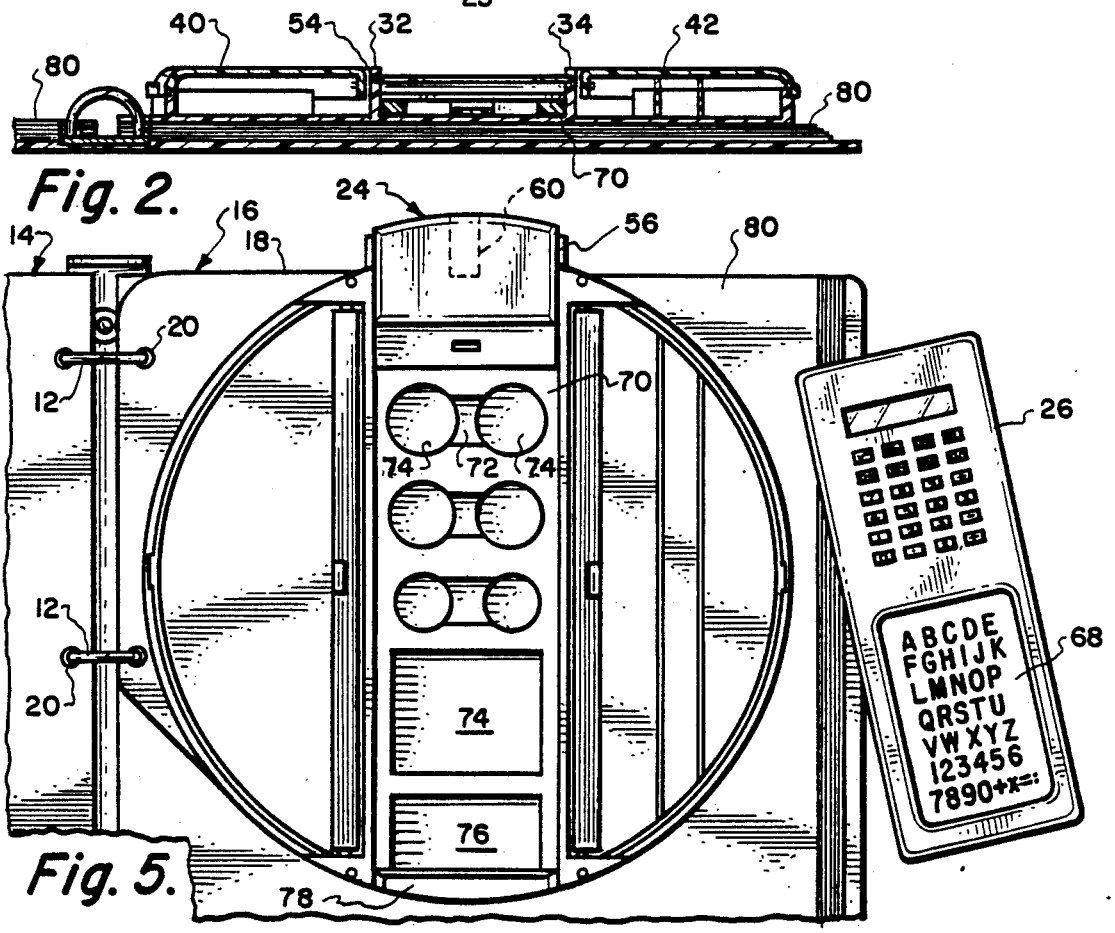

NOTEBOOK ORGANIZER INCLUDING SLIDABLE ELEMENT

BACKGROUND OF THE INVENTION

1. Field of the Invention

The present invention relates to notebook organizers and particularly relates to a notebook organizer which securable to the rings of the notebook and is provided with several compartments suitable for keeping small items that are of common use for businessmen an/or students, such as pencils, pens, postage stamps, business cards, etc.

2. Description of the Related Art

Users of notebooks often have a desire to organize and store items associated with the use of the notebook. Several devices have been previously patented which aid in this storage.

U.S. Pat. No. 2,495,687, entitled "BOX FOR LOOSE-LEAF HOLDERS" discloses a box for loose-leaf holders made, in part, by sheet material which comprises two telescopically associated sections that are hingedly connected so that the box can be opened and closed.

U.S. Pat. No. 2,677,376, entitled "POCKET FOR RING BINDERS" discloses a pocket for ring binders formed of flexible thermoplastic resin with special heat sealed reinforcements and a closure element, preferably a zipper.

U.S. Pat. No. 4,614,450, entitled "PORTABLE INDEX CARD HOLDER FOR NOTEBOOKS" discloses a portable index card holder for notebooks with a plurality of transparent sheets for containing the index cards, positioned in an overlapping array.

U.S. Pat. No. 4,824,273, entitled "ORGANIZATIONAL INSERT AND ALBUM" discloses an insert particularly suited for a student's school year. Each insert includes first and second sections joined along a common edge and movable from a folded condition essentially protecting the stored contents to an extended position which exposes information in certain display areas and allows removal of bulk stored information, such as report cards.

None of the aforementioned patents provides an efficient, space saving inexpensive means for containing, within the binder, several functional elements typically employed by users of such ringed binders.

SUMMARY OF THE INVENTION

A notebook organizer is disclosed which is sufficiently thin for convenient use in a ringed notebook. In its broadest aspects, the organizer comprises a base having a substantially flat bottom surface. The base has a border with a plurality of holes therethrough, the holes being adapted for engagement with the rings of a ringed notebook. The base includes a plurality of partitions dividing the base into a plurality of compartments. There is at least one lid associated with at least one of the compartments, including means for connecting the lid to the base, and locking means for releasably securing the lid in a closed position. The lid has a substantially flat upper surface.

In its more narrower aspects, the notebook organizer includes two symmetrically disposed side compartments, each side compartment has a side compartment lid. The side compartment lids are pivotally connected to the base on displaced parallel axes. A central compartment is disposed between the side compartments. The central compartment includes a longitudinal slot or guideway for cooperating with longitudinal extensions located on at least one functional element (such as a pencil sharpener or a calculator) securely postionable within the central compartment.

Other objects, advantages and novel features of the present invention will become apparent from the following detailed description of the invention when considered in conjunction with the accompanying drawings.

BRIEF DESCRIPTION OF THE DRAWINGS

FIG. 1 is a front perspective view of the notebook organizer of the present invention shown attached on a ringed notebook.

FIG. 2 is a cross-sectional view of the notebook organizer, taken along line 2—2 of FIG. 1.

FIG. 3 is a cross-sectional view illustrating the interrelationship of the pencil sharpener, housing and lid hinge, taken along line 3—3 of FIG. 1.

FIG. 4 is a cross-sectional view illustrating the interrelationship of the calculator, housing, and the pencil sharpener, taken along line 4—4 of FIG. 1.

FIG. 5 is a perspective view of the present invention, illustrating the side lids opened, the pencil sharpener partially removed, and the calculator removed, thereby exposing the coin holder.

The same elements or parts throughout the figures of the drawings are designated by the same reference characters.

DETAILED DESCRIPTION OF THE PREFERRED EMBODIMENTS

Referring to the drawings and the characters of reference marked thereon, FIG. 1 illustrates the notebook organizer of the present invention, designated generally as 10, attached to two rings 12 of a conventional ringed binder 14. The notebook organizer 10 includes a base 16 with a border 18 on its left side with holes 20 for engagement with rings 12. It has a circular rim 22 which is cutaway at the top and bottom to provide a center compartment 23 which provides slidable access for functional elements, such as a pencil sharpener assembly 24 and calculator 26, as will be explained below.

On each side of the center compartment 23 are two side compartments 28,30. The side compartments are formed by the cooperation of off-center partitions 32,34 (best seen in FIG. 2) and respective arced portions 36,38 of the rim 22. Off-center partitions 32,34 are chords of the circle formed by rim 22. Each side compartment 28,30 has a respective side compartment lid 40,42, also seen best in FIG. 2. The end of each lid is pivotally connected to one of of four horizontal extensions 44 of the rim 22 of the base. Each extension 44 includes a hole 46 for engaging a pin 48 extending from each lid 40,42 (see FIGS. 1 and 3). Thus, the side compartment lids are pivotally connected to the base on displaced parallel axes.

As mentioned above, the center compartment 23 accommodates a pencil sharpener assembly 24. The pencil sharpener assembly 24 includes side longitudinal extensions 50 which are slideably engaged by longitudinal slots or guideways 52, each extending the length of an off-center partition of the central compartment. (The calculator 26 has similar side longitudinal extensions 54.) Pencil sharpener assembly 24 includes a housing 56 with a pencil sharpener assembly lid 58 hinged thereto.

As can be seen in FIG. 3, the lid 58 includes the integral longitudinal extensions 50. Therefore, when the assembly 24 is in place within the organizer 10 the lid 58 cannot be opened. The pencil sharpener itself, designated by phantom lines 60, in FIG. 5, is secured within the upper section of the housing 56. The upper end of the housing 56 has a hole so that a pencil can be sharpened without requiring the removal of the assembly.

Referring now to FIG. 4, a central depression 62 in the bottom of the pencil sharpener housing 56 is illustrated. Depression 62 cooperates with a tab 64 in the base 16 to prevent slippage of the pencil sharpener assembly 24. The hinging mechanism 66 for the pencil sharpener is also illustrated in this Figure.

The calculator 26 has an upper surface with the side longitudinal extensions 54. Extensions 54, like the extensions on the pencil sharpener, engage the guideways 52 in the base. The calculator 26 also includes an opening (not shown) in its lower end to provide access for a removable stencil 68 which can viewed from an opening in the front face of the calculator 26.

A coin holder 70 is locatable at the bottom of the central compartment 23. The coin holder 70, like the other salient components of the present invention 10, is preferably formed of molded plastic. It is secured within the confines of the central compartment 23 by spaced tabs (not shown) located along its sides, which engage associated depressions (also not shown) in the off-center partitions 32,34. The upper surface of the portion of the base which forms the central compartment 23, includes projections (not shown) which cooperate with recesses in the coin holder 70 to prevent sliding of the coin holder 70 relative to the base. The coin holder 70 includes depressions 72 linking the coin holes 74. The depressions 72 enable the user to easily retract coins. Subcompartments 74,76 are also provided within the coin holder 70 for storing small articles such as keys, Post-it ™ type note pads, stamps, and other stickers.

During use, the coin holder 70 is secured into its correct position in the central compartment 23. The calculator 26 is then slid through the top of the guideway 52 until it abuts against a raised portion 78 at the lower end of the coinholder 70. Thus, raised portion 78 effectively provides a stop for the calculator 26. The pencil sharpener assembly 24 can then be slid through guideway 52 until it abuts the upper end of the calculator 26. Thus, the organizer 10, with its various elements positioned securely in place, efficiently organizes accessories which are typically used with a notebook 14. Organizer 10 has a height of approximately ⅜ inch, thus being sufficiently thin to fit conveniently between papers 80 of a conventional three-ring binder having, for example, 1½ inch rings.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A notebook organizer, comprising:
   (a) a base having a substantially flat bottom surface, said base having a border with a plurality of holes therethrough, said holes being adapted for engagement with the rings of a ringed notebook, said base including a plurality of partitions dividing said base into a plurality of compartments, said partitions having longitudinal slots formed on opposing partition surfaces thereon;
   (b) at least one functional element having a longitudinal extension thereon being slideably engageable with, and supported between, said opposing partition surfaces; and,
   (c) a lid being associated with at least one of said compartments, including means for connecting said lid to said base, and locking means for releasably securing said lid in a closed position, said lid having a substantially flat upper surface, the organizer being sufficiently thin for convenient use in a ringed notebook.

2. The notebook organizer of claim 1, wherein said notebook organizer includes:
   two symmetrically disposed side compartments, each side compartment having a side compartment lid, said side compartment lids being pivotally connected to said base on spaced parallel axes.

3. The notebook organizer of claim 2, wherein said base includes a central compartment disposed between said side compartments.

4. The notebook organizer of claim 3, wherein said at least one functional element includes a pencil sharpener supportable within said central compartment.

5. The notebook organizer of claim 3, further including a hidden coin holder supportable within said central compartment.

6. The notebook organizer of claim 3, wherein said at least one functional element includes a calculator supportable within said central compartment.

7. The notebook organizer of claim 3, further including:
   a removable hidden compartment element disposable at the bottom of said central compartment and engageable with said partitions, said at least one functional element being slideably engageable over said hidden compartment.

8. The notebook organizer of claim 7, wherein said at least one functional element includes a thin calculator.

9. A notebook organizer, comprising:
   (a) a base having a substantially flat bottom surface, said base having a border with a plurality of holes therethrough, said holes being adapted for engagement with the rings of a ringed notebook, said base including,
      i) a rim forming the outer periphery of a plurality of compartments; and
      ii) a plurality of partitions which cooperate with portions of said rim to form sides of said plurality of compartments, said partitions having longitudinal slots formed on opposing partition surfaces thereon;
   (b) at least one functional element having a longitudinal extension thereon being slidably engageable with, and supported between, said opposing partition surfaces; and,
   (c) a lid being associated with said at least one compartment, including means for connecting said lid to said base, and locking means for releasably securing said lid in a closed position, said lid having a substantially flat upper surface, the organizer being sufficiently thin for convenient use in a ringed notebook.

10. The notebook organizer of claim 9 wherein said base, includes:
   a) two side enclosed compartments, each side compartment formed by one of two off-center partitions cooperating with a respective portion of said rim to provide such an enclosed compartment; and, b) a central compartment formed by said two off-center partitions.

11. The notebook organizer of claim, 10 wherein each off-center partition includes a longitudinal slot for cooperating with a longitudinal extension located on at least one functional element securely locatable within said central compartment.

12. The notebook organizer of claim 9 wherein said rim is substantially circular.

13. The notebook organizer of claim 12 wherein said base includes, (a) a first side compartment, said first side compartment being formed by a first arced portion of said rim in cooperation with a first off-center partition, said first off-center partition being a first chord of the circle formed by said rim; and, (b) a second side compartment, said second side compartment formed by a second arced portion of said rim in cooperation with a second off-center partition, said second off-center partition being a second chord of the circle formed by said rim.

14. The notebook organizer of claim 13 wherein each side compartment includes a side compartment lid, said side compartment lids being pivotally connected to said base on spaced parallel axes.

15. The notebook organizer of claim 14 wherein each side compartment lid includes a catch portion for inter-engaging an associated portion on each base for releasably securing said lid in a closed position.

16. The notebook organizer of claim 14, wherein said base includes a central compartment disposed between said side compartments.

* * * * *